United States Patent [19]

Rohra et al.

[11] Patent Number: 5,137,425
[45] Date of Patent: Aug. 11, 1992

[54] PROPFAN ENGINE HAVING TWO OPPOSITELY ROTATING FAN ROTORS

[75] Inventors: Alois Rohra; Klaus Britz, both of Munich; Martin Cempirek, Karlsfeld, all of Fed. Rep. of Germany

[73] Assignee: MTU Motoren- und Turbinen-Union Muchen GmbH, Fed. Rep. of Germany

[21] Appl. No.: 628,181

[22] Filed: Dec. 6, 1990

[30] Foreign Application Priority Data

Dec. 19, 1989 [DE] Fed. Rep. of Germany ....... 3941852

[51] Int. Cl.⁵ .............................................. B63H 5/10
[52] U.S. Cl. ................... 416/129; 416/170 R
[58] Field of Search ............... 416/128, 129, 130, 160, 416/170 R

[56] References Cited

U.S. PATENT DOCUMENTS

| 4,237,751 | 12/1980 | Davis | 416/170 R |
| 4,728,261 | 3/1988 | Wright et al. | 416/129 |
| 4,738,589 | 4/1988 | Wright | 416/129 |
| 4,772,181 | 9/1988 | Poucher | 416/129 |
| 4,936,746 | 6/1990 | Mayo et al. | 416/128 |
| 5,010,729 | 4/1991 | Adamson et al. | 416/129 |
| 5,028,207 | 7/1991 | Rohra et al. | 416/129 |
| 5,030,149 | 7/1991 | Fujita | 416/129 |

FOREIGN PATENT DOCUMENTS

| 3714990 | 12/1988 | Fed. Rep. of Germany . | |
| 3812027 | 10/1989 | Fed. Rep. of Germany . | |
| 998574 | 1/1952 | France | 416/129 |
| 402447 | 3/1943 | Italy | 416/128 |

Primary Examiner—Edward K. Look
Assistant Examiner—Thomas Denion
Attorney, Agent, or Firm—Evenson, Wands, Edwards, Lenahan & McKeown

[57] ABSTRACT

A propfan engine having two oppositely rotating fan rotors both driven by a low-pressure turbine by way of a drive shaft includes a reversing transmission. The reversing transmission drives one fan rotor, while the other fan rotor is coupled directly to the drive shaft. This construction permits a favorable design of the rotational speeds of the fan rotors and of the turbine and, in comparison to a conventional transmission, requires less space and weight for both fan rotors.

7 Claims, 2 Drawing Sheets

PROPFAN ENGINE HAVING TWO OPPOSITELY ROTATING FAN ROTORS

BACKGROUND AND SUMMARY OF THE INVENTION

This invention relates to a propfan engine having two oppositely rotating fan rotors and, more particularly, to a propfan engine having two oppositely rotating fan rotors which are both driven by a low-pressure turbine via a drive shaft.

Known propfan engines of the above-mentioned type have either been constructed with transmissions transmitting all of the power supplied by the low-pressure turbine to the fan rotors and then branching it off correspondingly or, each of the two fan stages is coupled with its own shaft by means of which the corresponding power can be supplied to each fan stage by a separate turbine.

In both types of propfan engines, the rotational speed of the fan stages is relatively low because the tip speed must be kept within certain limits for noise reasons. For those engines tested having a fan diameter of approximately 2.5 to 3.5 m, the rotational speeds are in the range of between 1,200 r.p.m in the case of large engines, and 1,900 r.p.m. in the case of smaller engines.

German Patent Document DE-OS 37 14 990 discloses a propfan engine having a differential gear in which the rear fan stage is driven by way of the ring gear of a planetary transmission. The front fan stage is driven by way of a planet carrier. This requires relatively high low-pressure turbine rotational speeds, mainly for smaller engines, because the transmission ratio for these transmissions cannot be constructed to be below approximately 4.0 to 4.5 in the case of the same rotational speed but with an opposite rotating direction of the two fan stages.

Although the development of such low-pressure turbines having rotational speeds above 8,000 r.p.m. is aerodynamically possible, it results in considerable mechanical problems. These problems concern the fact that the occurring edge loads on the rotor blades are very high and lead to high tensions in the rotor disks and the rotor blades. Because of the high rotational operating speed, a supercritical low-pressure turbine shaft course must be expected. This critical shaft course requires a difficult vibration-technical coordination of the rotor system. In addition, such transmissions incur high technical costs because of the high performances which must be achieved.

As a result of uncoupling the fan turbine and the low-pressure turbine by means of the transmission, it must be expected that very high axial forces on the thrust bearings of the engines will occur. This has the result of requiring an increase in the engine weight as a support with respect to these forces.

German Patent Document DE-OS 38 12 027 discloses a propfan engine having two fan stages. The propfan engine is driven by two turbine stages via two separate shafts. This arrangement requires a two-stage low-pressure turbine, the rotors of which are arranged either behind one another or in opposite directions inside one another. However, both solutions have the disadvantage of requiring high technical expenditures and result in technical problems with respect to their bearing. This is because they have two shafts or, when taken together with the gas-producer shaft, three shafts.

Another serious problem in the case of known propfan engines is the ability to guide the two shafts through the core engine. The narrow points through which the shafts must pass include the bores in the disks of the first high-pressure compressor stage and of the high-pressure turbine. The size of the disk bores and the diameters of the shafts must be coordinated with one another to allow permissible disk tensions as well as satisfactory behavior of the engine with respect to the shaft dynamics. Satisfying these requirements, which tend to require contrasting solutions, necessarily leads to compromises, i.e., the expectations must be lowered for all requirements.

There is therefore needed a propfan engine which has a technically simple construction and is as low as possible in weight.

The present invention meets these needs by providing a propfan engine in which one of the fan rotors is directly driven and the other fan rotor is driven by the directly driven fan rotor through the use of a reversing transmission.

The present invention has a number of advantages. Only one shaft has to be guided through the core engine. The power passing through the reversing transmission amounts to only half the overall power thus resulting in a considerable reduction of the volume and the weight of the transmission in comparison to the conventional transmission solution.

It is advantageous that the direct drive may take place either for the rear or the front fan rotor since the power absorption of the fan rotors may differ. In this case, the direct drive takes place for the higher-power fan stage which leads to a further reduction of the volume and the weight of the transmission.

In a preferred embodiment of the invention, the reversing transmission is constructed as a planetary transmission. This construction has the advantage of a lower weight and, particularly because of its ring-shaped construction, is suitable to be installed in the propfan engine. In this case, the planet gears are preferably disposed in the drive shaft. In the case of both embodiments, the arrangement of the invention permits a particularly space-saving transmission arrangement under the tight conditions found in an engine.

In another preferred embodiment of the invention, the planet gears are provided with pinions which are stepped in their diameter and of which one pinion mates with a ring gear coupled with the second fan stage, and the other pinion mates with a housing ring gear supported at the housing. In this case, the pinions are preferably mounted on both sides of the planet gears, i.e., they are suspended in their center area. This has the advantage of a uniform loading of the bearings whereby a bearing space as small as possible is achieved.

Preferably, the two pinions are stepped in their diameter in such a manner that the fan rotor which is driven by way of the reversing transmission rotates at an identical and opposite rotational speed as the directly driven fan rotor. It is also possible to select a different pinion ratio to intentionally provide unequal rotational speeds of the two fan rotors if desirable for aerodynamic or other reasons.

Another advantage of the present invention has the planet gears additionally driving a medium-pressure compressor. Such a compressor, which is frequently called a booster, permits a further increase of the pressure ratio and can be driven in a particularly simple manner by means of a third pinion on the planet gears.

For this purpose, a compressor ring gear is provided which mates with the third pinion and is connected with the medium-pressure compressor. By selecting an appropriate pinion, an arbitrary ratio can be achieved from the direction of the drive shaft.

Other objects, advantages and novel features of the present invention will become apparent from the following detailed description of the invention when considered in conjunction with the accompanying drawings.

DETAILED DESCRIPTION OF THE DRAWINGS

Figure 1:
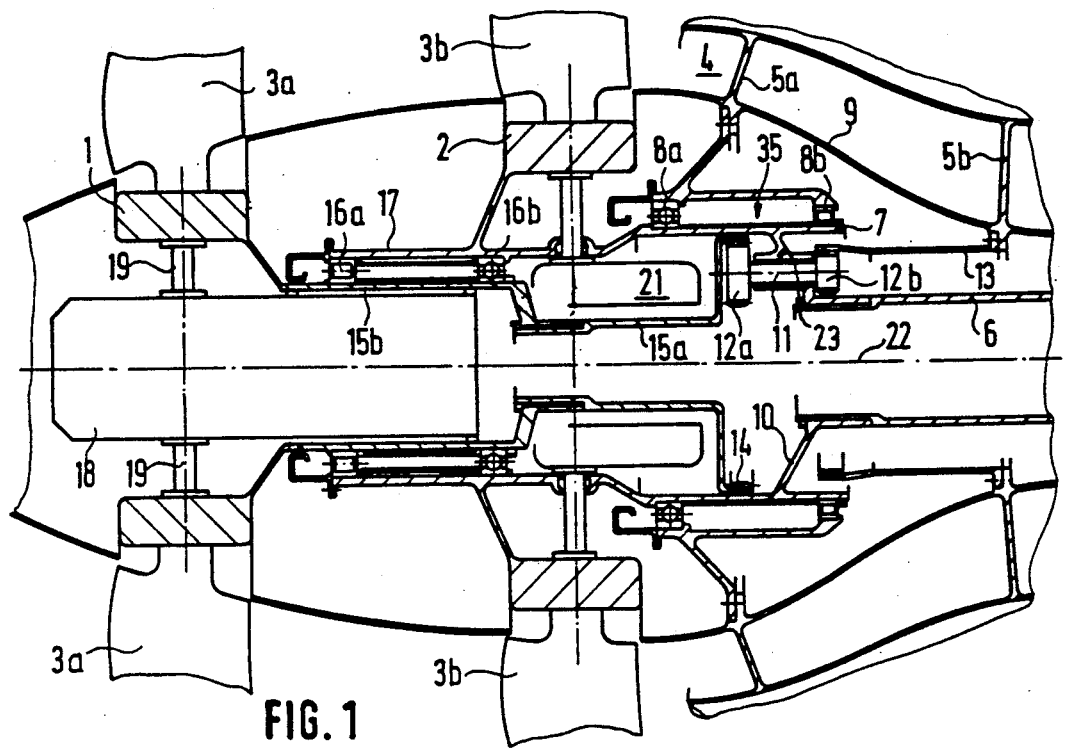
FIG. 1 is a partial longitudinal sectional view of the front part of a propfan engine in which the rear fan rotor is directly driven.

FIG. 1 illustrates the front part of a propfan engine in which the rear fan rotor is directly driven. The front part essentially includes two propfan rotors 1, 2 which rotate in opposite directions from one another and are arranged axially behind one another. Both propfan rotors 1, 2 are equipped with propfan blades 3a, 3b distributed over the circumference of the rotors 1, 2. Downstream of the rear propfan rotor 2, an inlet duct 4 for the gas turbine or core engine (not shown) is provided in which a row of axially aligned supporting ribs (the front and rear edges 5a and 5b of these supporting ribs being visible in FIG. 1) are arranged. By way of these supporting ribs 5a, 5b, the propulsive thrust generated by the propfan blades 3a, 3b is transmitted to the airplane.

A drive shaft 6, which is used for driving both propfan rotors 1, 2 originates in the core engine or from the core engine's low-pressure turbine. In an embodiment shown, the rear propfan rotor 2 is connected directly with the drive shaft 6 via a supporting sleeve 17, a bearing sleeve 7 and an intermediate cone 10. Similarly, the rear propfan rotor 2 is supported in the housing 9 via the bearing sleeve 7 and the bearings 8a, 8b disposed on the sleeve 7. In the intermediate cone 10, a reversing transmission 35 has a number of planet gears 11 which are distributed around the circumference of the cone 10. The planet gears 11 are provided with pinions 12a, 12b on both sides. One pinion 12b of each of the planet gears 11 mates with a housing ring gear 13 which is fastened to the housing 9 and is used for support with respect to the bearing pressures. The other pinion 12a mates with a ring gear 14 which, in turn, drives the front propfan rotor 1. The propfan rotor 1 is driven via two shaft sections 15a, 15b which are connected with one another.

The front propfan rotor 1 is disposed in the support sleeve 17 connected with the rear propfan rotor 2 via intermediate-shaft bearings 16a, 16b.

A blade adjusting mechanism 18 is located radially inside the front connection shaft section 15b. The blade adjusting mechanism 18 allows the propfan blades 3a of the front propfan rotor 1 to be adjusted through the use of swivel shafts 19. An adjusting device, situated in the space 21 (not shown), for the blades 3b of the rear propfan rotor 2 is driven via adjusting planet gears 20 disposed in the connection shaft 15a.

In operation, when the drive shaft 6 rotates, the rear propfan rotor 2 rotates at the same rotational speed because of the direct coupling of the rotor 2 to the drive shaft 6. At the same time, the planet gears 11 rotate around the engine axis 22 and in the case of a corresponding size of the pinions 12b, around their own axis. As a result of the ratio of the two pinions 12a, 12b, the ring gear 14 and the propfan rotor 1 coupled with the ring gears 14 rotate in the opposite direction from the propfan rotor 2. In this case, the size of the two pinions 12a, 12b and the radial distance of the center axes of the planet gears 11 from the engine axis 22 are coordinated with one another such that the rotational speeds of the two propfan rotors 1 and 2 are identical in an opposite direction.

Figure 2:
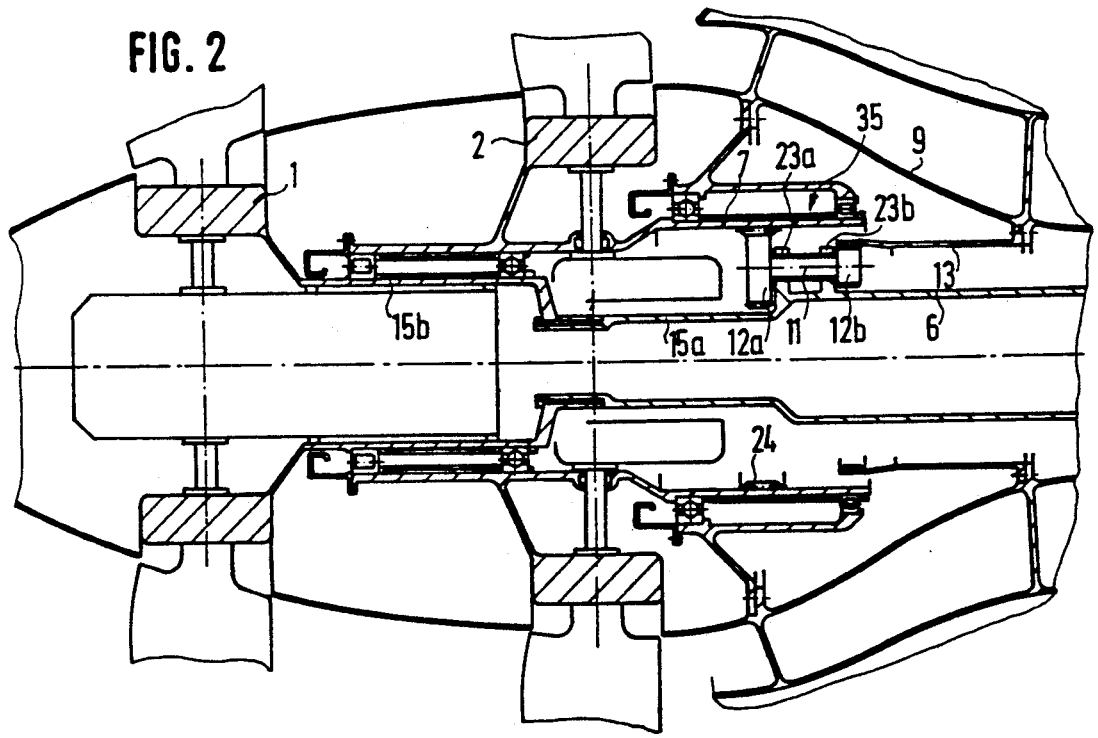
FIG. 2 is a partial longitudinal sectional view of an embodiment of the invention with a directly driven front fan rotor.

The embodiment illustrated in FIG. 2 has the drive shaft 6, via the connecting shafts sections 15a and 15b, connected directly with the front propfan rotor 1. The planet gears 11 are rotatably connected through the use of two holding flanges 23a, 23b molded onto the drive shaft 6.

While the pinion 12b is in turn connected with the housing 9 through the housing ring gear 13, the other pinion 12a engages an internal toothing 24 mounted on the bearing sleeve 7. As a result, the bearing sleeve 7 and the rear propfan rotor 2 connected with the bearing sleeve 7 are set into rotation oppositely to the rotation direction of the drive shaft 6.

Figure 3:
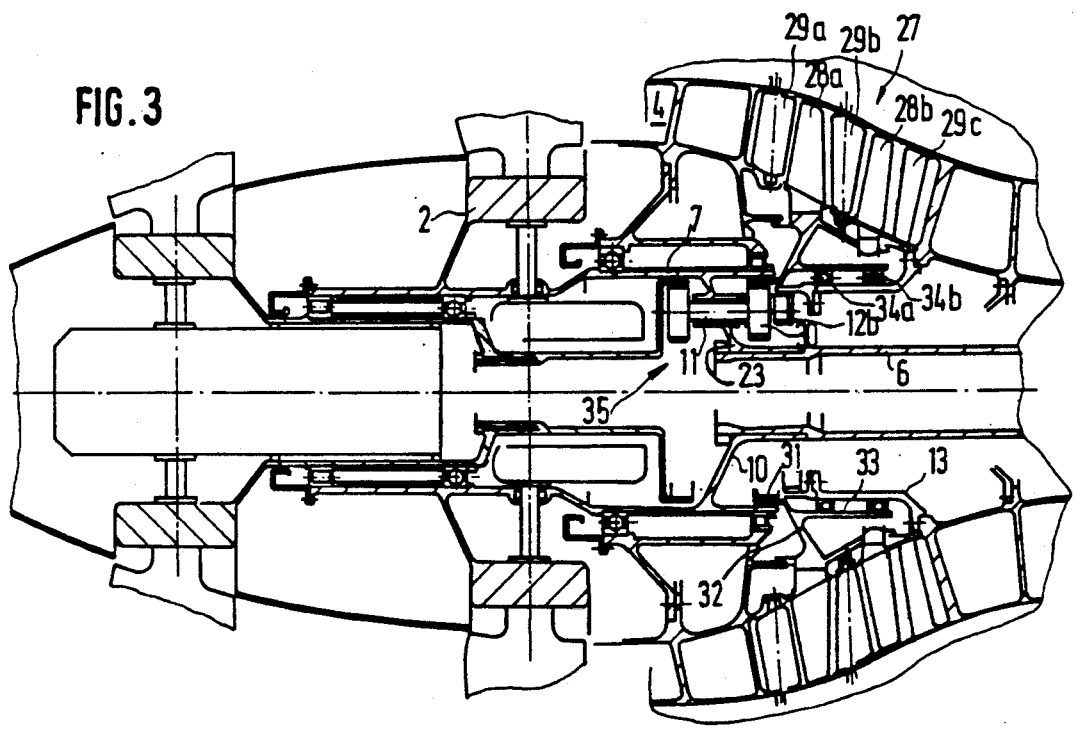
FIG. 3 is a partial longitudinal sectional view of yet another embodiment of the invention having a medium-pressure compressor.

FIG. 3 shows a modification of the embodiment shown in FIG. 1 in which the rear propfan rotor 2 is coupled with the intermediate cone 10 to the drive shaft 6 by way of the bearing sleeve 7. According to this construction, a medium-pressure compressor or booster 27 is provided in the inlet duct 4 and is constructed of two rotating rows of rotor blades 28a, 28b and three rows of guide blades 29a, 29b, 29c. The first two rows of guide blades 29a, 29b are constructed so as to swivel. Naturally, it is also possible to construct the medium-pressure compressor 27 with more or less steps. For driving the medium-pressure compressor 27, the planet gears 11 have a third pinion 30 which, in the embodiment shown, is arranged next to the housing-side pinion 12b. The third pinion 30 mates with a compressor ring gear 31 which, in turn by way of a cone 32, is coupled with the two rows of rotor blades 28a, 28b. A bearing bushing 33 is also molded onto the cone 32 and is used for bearing the medium-pressure compressor 27 via the bearings 34a and 34b supported at the housing ring gear 13.

What is claimed is:

1. A propfan engine having a housing comprising:
   two oppositely rotating fan rotors;
   a drive shaft coupled to the propfan engine driving said two fan rotors, said drive shaft directly driving one of said two fan rotors;
   a reversing transmission including planet gears and at least two pinions of different diameters, said drive shaft driving the other of said two fan rotors via said reversing transmission;
   wherein said planet gears have a web connected with said drive shaft on one side and with said one fan rotor on the other side;
   a housing ring gear fixedly arranged on the housing, wherein one of said at least two pinions of said planet gears mates with said housing gear; and a second ring gear drivingly engaging said other fan rotor, wherein the other of said at least two pinions mates with said second ring gear.

2. A propfan engine according to claim 1, wherein said planet gears additionally drive a medium-pressure compressor.

3. A propfan engine according to claim 2, wherein said planet gears include third pinions which mate with a compressor ring gear connected with the medium-pressure compressor.

4. A propfan engine according to claim 1, wherein the propfan rotor which is in front in the flow direction is directly driven.

5. A propfan engine according to claim 1, wherein both of said two propfan rotors rotate at an oppositely identical rotational speed.

6. A propfan engine according to claim 1, wherein both of said two propfan rotors rotate at an opposite but different rotational speed.

7. A propfan engine according to claim 1, wherein said planet gears are disposed between said pinions and the planet gears are connected with said web.

* * * * *